United States Patent
Kitai et al.

(10) Patent No.: US 12,452,527 B2
(45) Date of Patent: Oct. 21, 2025

(54) IMAGE CAPTURE APPARATUS AND CONTROL METHOD

(71) Applicant: CANON KABUSHIKI KAISHA, Tokyo (JP)

(72) Inventors: Shimpei Kitai, Chiba (JP); Toshimichi Ise, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 146 days.

(21) Appl. No.: 18/486,078

(22) Filed: Oct. 12, 2023

(65) Prior Publication Data

US 2024/0040237 A1 Feb. 1, 2024

Related U.S. Application Data

(63) Continuation of application No. PCT/JP2022/014364, filed on Mar. 25, 2022.

(30) Foreign Application Priority Data

Apr. 14, 2021 (JP) ................................ 2021-068530
Jan. 25, 2022 (JP) ................................ 2022-009526

(51) Int. Cl.
*H04N 23/63* (2023.01)
*H04N 23/611* (2023.01)
*H04N 23/661* (2023.01)

(52) U.S. Cl.
CPC ......... *H04N 23/633* (2023.01); *H04N 23/611* (2023.01); *H04N 23/661* (2023.01)

(58) Field of Classification Search
CPC .. H04N 23/633; H04N 23/611; H04N 23/661; H04N 23/00; G03B 15/00; G03B 17/18
See application file for complete search history.

(56) References Cited

U.S. PATENT DOCUMENTS

| | | | |
|---|---|---|---|
| 2001/0033332 A1* | 10/2001 | Kato | G08B 13/19682 348/E7.086 |
| 2016/0241789 A1* | 8/2016 | Mayuzumi | H04N 23/661 |
| 2017/0026680 A1* | 1/2017 | Sugio | H04N 21/2187 |

FOREIGN PATENT DOCUMENTS

| | | |
|---|---|---|
| JP | 2012156571 A | 8/2012 |
| JP | 2013101463 A | 5/2013 |
| JP | 2014082591 A | 5/2014 |

(Continued)

*Primary Examiner* — Yogesh K Aggarwal
(74) *Attorney, Agent, or Firm* — Canon U.S.A., Inc. IP Division

(57) ABSTRACT

An image capture apparatus performs control to display a subject image, receives an image captured by another other image capture apparatus, and determines whether or not the other image capture apparatus is capable of capturing an image of a range including the subject. When the other image capture apparatus is capable of capturing an image of the range including the subject, a control is performed to display, on the subject image, an index indicating the image-capturing direction at a location corresponding to the image-capturing position of the image, and the determination is performed by executing pattern matching processing or subject recognition processing on the subject image and the received image from the other image capture apparatus, and the other image capture apparatus is capable of capturing an image of the range including the subject if the subject matches a subject included in the received image.

14 Claims, 11 Drawing Sheets

(56) References Cited

FOREIGN PATENT DOCUMENTS

| | | |
|---|---|---|
| JP | 2014131200 A | 7/2014 |
| JP | 2015167310 A | 9/2015 |
| JP | 2018026603 A | 2/2018 |
| JP | 2019102845 A | 6/2019 |
| JP | 2019133214 A | 8/2019 |
| WO | 2013/129188 A1 | 9/2013 |

\* cited by examiner

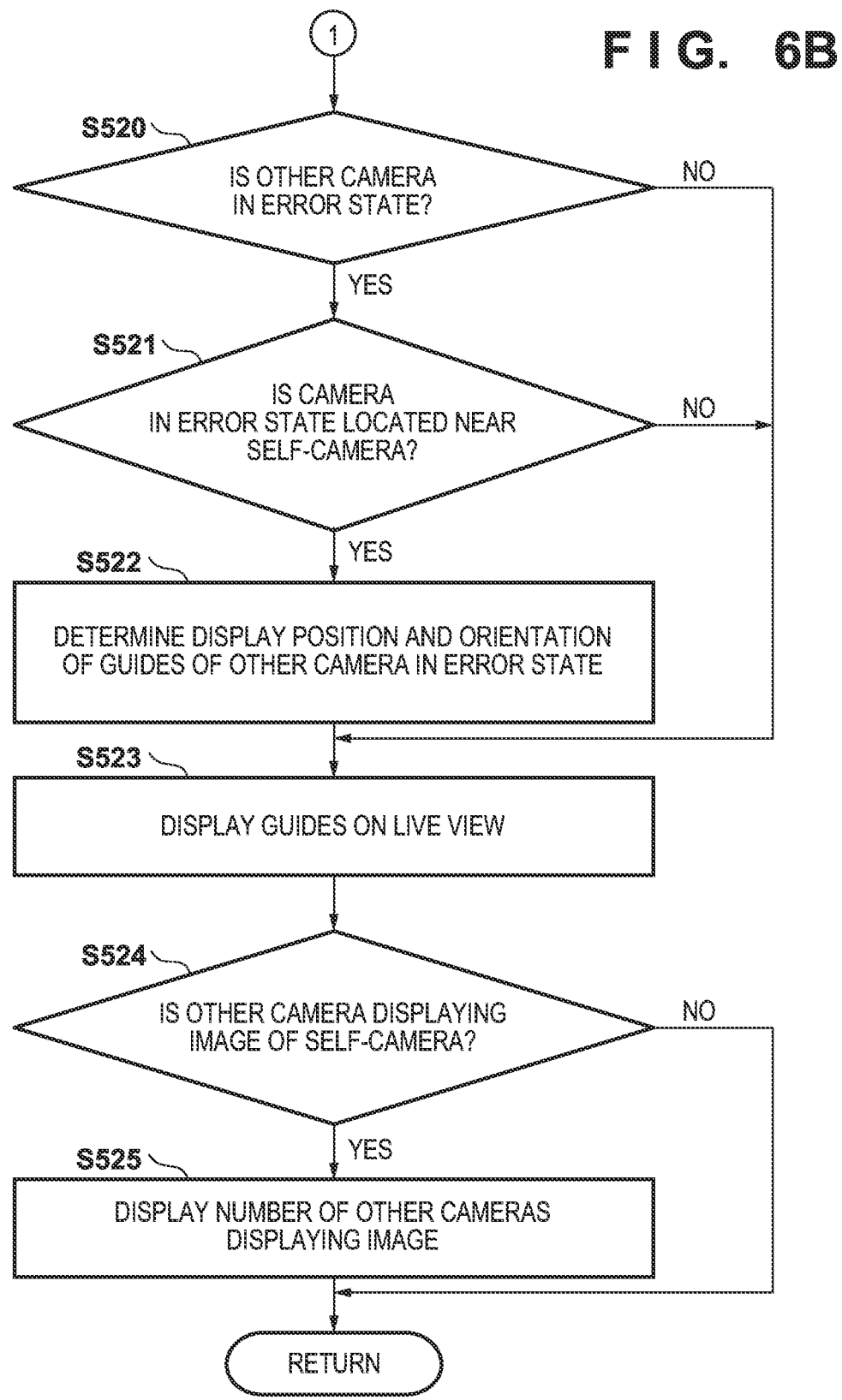

IMAGE CAPTURE APPARATUS AND CONTROL METHOD

CROSS-REFERENCE TO RELATED APPLICATIONS

This application is a Continuation of International Patent Application No. PCT/JP2022/014364, filed Mar. 25, 2022, which claims the benefit of Japanese Patent Application Nos. 2021-068530, filed Apr. 14, 2021 and 2022-009526, filed Jan. 25, 2022, all of which are hereby incorporated by reference herein in their entirety.

BACKGROUND OF THE INVENTION

Field of the Invention

The present invention relates to a system for capturing images of a subject from a plurality of viewpoints.

Background Art

PTL 1 describes a method of capturing images of the same subject using a plurality of cameras at the same time. In recent years, the method of PTL 1 has been realized using user terminals such as smartphones, and the user terminals can transmit live view images captured by these terminals to each other. PTL 2 describes a method that makes it possible to change the viewpoint position in any direction in a multi-viewpoint image associated with positions of viewpoints from which the image has been captured, and display an image after moving the viewpoint position from the current viewpoint position to a viewpoint position in any direction.

CITATION LIST

Patent Literature

PTL1: Japanese Patent Laid-Open No. 2018-026603
PTL2: Japanese Patent Laid-Open No. 2019-133214

When a user attempts to display, on the user terminal of this user, an image captured by another user terminal, the user needs to select a user terminal that has captured the image that the user is to display. However, it is unknown whether or not the image captured by the user terminal that the user is about to select is an image captured at a desirable image-capturing position and in a desired image-capturing direction for the user, until the user switches the displayed image to the image captured by the other user terminal. In addition, in PTL 2, even if the viewpoint position is moved in any direction, if a plurality of user terminals are present in the direction in which the viewpoint position is moved, the user needs to repeatedly switch the displayed image to images from the other user terminals in order to find an image captured at a desired image-capturing position and in a desired image-capturing direction.

The present invention has been made in view of the foregoing problem, and realizes a technology that enables a user to select and display an image captured at a desired image-capturing position and in a desired image-capturing direction without performing the operation to repeatedly switch between images from other user terminals when displaying, on a user terminal of the user, an image captured by another user terminal.

SUMMARY OF THE INVENTION

In order to solve the aforementioned problems, the present invention provides an image capture apparatus comprising: a processor; and a memory storing instructions which, when executed by the processor, configure the processor of the image capture apparatus to: capture an image of a subject; perform control to display the image of the subject on a screen; obtain first information regarding an image-capturing position and an image-capturing direction of another image capture apparatus; receive an image captured by the other image capture apparatus; and determine whether or not the other image capture apparatus is capable of capturing an image of a range including the subject, wherein, when the other image capture apparatus is capable of capturing an image of the range including the subject, a control is performed to display, on the image of the subject, an index indicating the image-capturing direction at a location corresponding to the image-capturing position of the image, based on the first information, and wherein the determination is performed by executing pattern matching processing or subject recognition processing on the image of the subject and the received image, and the other image capture apparatus is capable of capturing an image of the range including the subject if the subject matches a subject included in the received image.

In order to solve the aforementioned problems, the present invention provides a method of controlling an image capture apparatus, the method comprising: capturing an image of a subject; performing control to display the image of the subject on a screen; obtaining first information regarding an image-capturing position and an image-capturing direction of another image capture apparatus; and receiving an image captured by the other image capture apparatus; and determining whether or not the other image capture apparatus is capable of capturing an image of a range including the subject, wherein, when the other image capture apparatus is capable of capturing an image of the range including the subject, the control is performed based on the first information to display, on the image of the subject, an index indicating the image-capturing direction at a location corresponding to the image-capturing position of the image, and wherein, the determination is performed by executing pattern matching processing or subject recognition processing on the image of the subject and the received image, and the other image capture apparatus is capable of capturing an image of the range including the subject if the subject matches a subject included in the received image.

In order to solve the aforementioned problems, the present invention provides a non-transitory computer-readable storage medium storing a program for causing a computer to execute a method of controlling an image capture apparatus, the method comprising: capturing an image of a subject; performing control to display the image of the subject on a screen; obtaining first information regarding an image-capturing position and an image-capturing direction of another image capture apparatus; and receiving an image captured by the other image capture apparatus; and determining whether or not the other image capture apparatus is capable of capturing an image of a range including the subject, wherein, when the other image capture apparatus is capable of capturing an image of the range including the subject, the control is performed based on the first information to display, on the image of the subject, an index indicating the image-capturing position of the image, and wherein, the determination is performed by executing pattern matching processing or subject recognition processing on the image of the subject and the received image, and the other image capture apparatus is capable of capturing an image of the range including the subject if the subject matches a subject included in the received image.

Further features of the present invention will become apparent from the following description of exemplary embodiments with reference to the attached drawings.

BRIEF DESCRIPTION OF THE DRAWINGS

FIG. 6B is a flowchart showing an operation procedure when image-capturing information is displayed.

DESCRIPTION OF THE EMBODIMENTS

Figure 1:
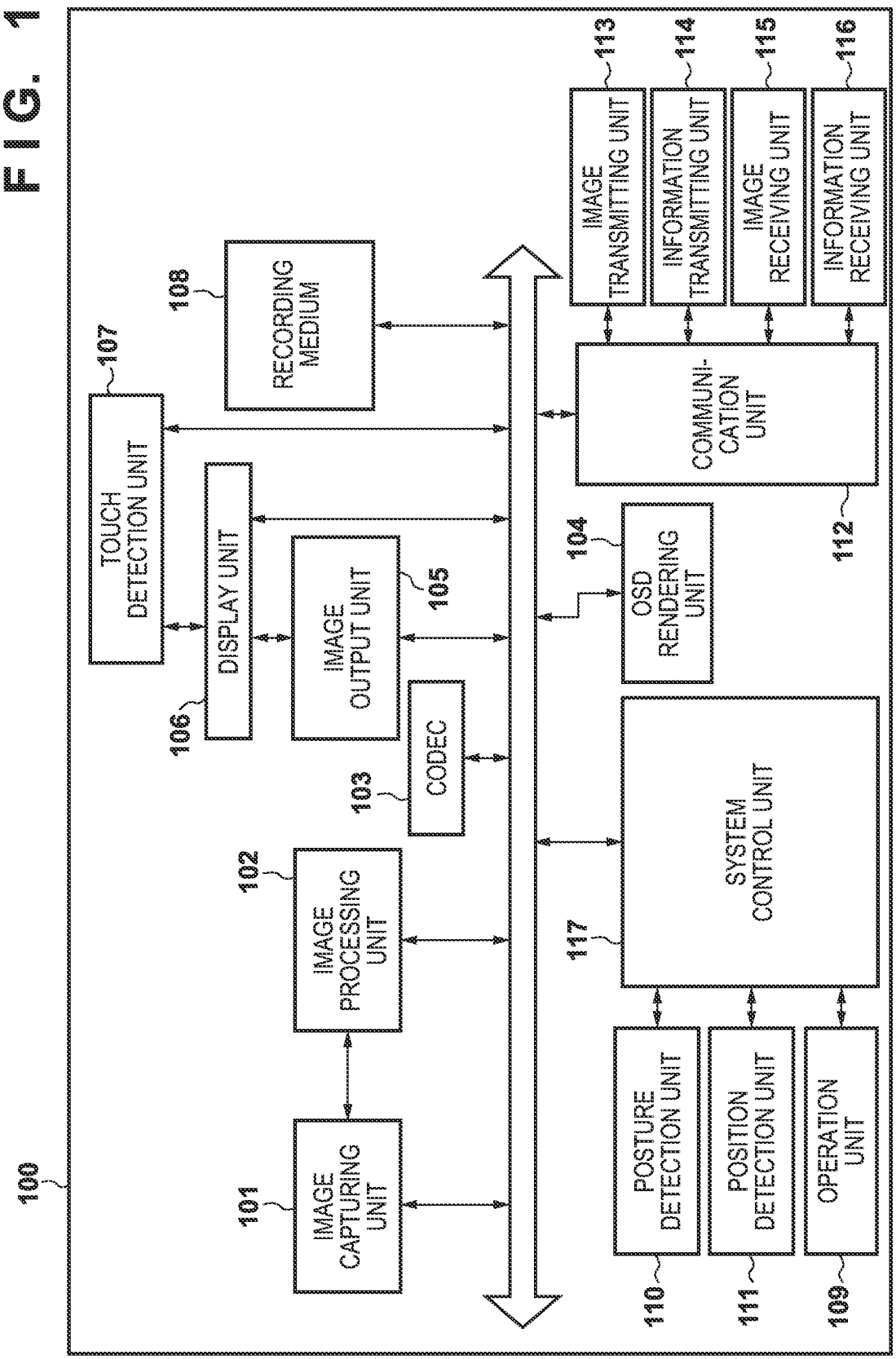
FIG. 1 is a block diagram showing an example of an apparatus configuration of the present embodiment.

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

Embodiment 1

The following is a description of an embodiment of an image capture apparatus of the present invention applied to a user terminal having a camera function, such as a smartphone.

Note that the user terminal is not limited to a smartphone, which is a type of cell phone, and may also be a personal computer (PC) or a tablet terminal having a camera function, an eyeglass-type terminal, a wristwatch-type terminal, a digital camera having a communication function, or the like.

First, a configuration and functions of the user terminal of the present embodiment will be described with reference to FIG. 1.

FIG. 1 is a block diagram showing a configuration of a user terminal 100 of the present embodiment.

The user terminal 100 of the present embodiment has components described below built-in a body case that constitutes a housing.

An image capturing unit 101 includes an image sensor that converts an optical image into an electrical signal, and an A/D converter that converts an analog electrical signal generated by the image sensor into a digital signal. More than one image capturing units 101 may be provided. In this case, the user can switch the camera of the user terminal 100 between an out-camera to capture an image of a subject and an in-camera to capture an image of the user by orienting the image capturing units in different directions.

An image processing unit 102 performs predetermined resizing processing, trimming processing, color conversion processing, and distortion correction processing on image data (including a live view image) generated by the image capturing unit 101, and outputs the processed data to an image output unit 105. The image processing unit 102 also recognizes the face of each person as a subject in an image and notifies a system control unit 117 of the recognized subject.

A codec 103 encodes the image data processed by the image processing unit 102 in a moving image compression format such as MPEG2 or H.264 and records the encoded image data as a moving image file on a recording medium, or decodes a moving image file read from a recording medium 108 and outputs the decoded image file to the image output unit 105.

An OSD rendering unit 104 renders guides or an indexes represented by items such as text strings or icons, AF frames, markers, or later-described vector indications, which represent the state and settings of the user terminal 100, in accordance with a control instruction from the later-described system control unit 117. After the rendering has been performed, the OSD rendering unit 104 outputs the rendered data as OSD (On Screen Display) data to the image output unit 105.

The image output unit 105 generates a display image signal by superimposing the image data processed by the image processing unit 102, the image data decoded by the codec 103, and the OSD data output from the OSD rendering unit 104, and outputs the generated display image signal to a display unit 106.

The display unit 106 is a display device, such as a liquid-crystal panel or an organic EL panel, that displays the image signal obtained from the image output unit 105. More than one display units 106 may be provided, or the display unit 106 may be an external device connected to the user terminal 100.

A touch detection unit 107 is a touch screen integrated into the display unit 106. The touch detection unit 107 is capable of detecting a touch operation made to the surface of the display unit 106 (touch detection surface) by the user, and notifies the system control unit 117 of an operation instruction corresponding to the detected touch operation.

The recording medium 108 is a storage device in which the image data encoded by the coded 103 can be written and from which the recorded encoded image data and accompanying data can be read. The recording medium 108 is a memory card or a hard disk that can be attached to and removed from the user terminal, or a flash memory or a hard disk incorporated in the user terminal.

An operation unit 109 is an operation member such as a push button or a slide switch, and enables input of various operation instructions to the system control unit 117 in accordance with user operations. The operation unit 109 includes, for example, a home button, a power button, a volume button, or the like.

A posture detection unit 110 detects a horizontal or vertical tilt of the user terminal 100 (a direction in which an image of the subject is captured) and notifies the system control unit 117 of the detected tilt information. A position detection unit 111 detects the current position of the user terminal 100 (a position at which an image of the subject is captured) and notifies the system control unit 117 of the detected position information.

A communication unit 112 enables the user terminal 100 to communicate with external devices such as other user terminals. The communication unit 112 functions as an image transmitting unit 113, an information transmitting unit 114, an image receiving unit 115, and an information receiving unit 116. For example, mobile communications using 4G, 5G, or the like, wireless communications using a wireless LAN or the like, or network communications using a peer-to-peer network or the like may be used as a communication method.

The image transmitting unit 113 transmits the image data generated by the image capturing unit 101 and processed by the image processing unit 102, to other user terminals.

The information transmitting unit 114 transmits image-capturing information regarding the image data to other user terminals. The image-capturing information includes, for example, an image-capturing position and an image-capturing direction that are calculated from the tilt information regarding the user terminal 100 detected by the posture detection unit 110 and information indicating the current position of the user terminal 100 detected by the position detection unit 111 when an image is captured. The image-capturing information also includes, for example, resolution (4K or 2K) information regarding an image related to resizing processing performed by the image processing unit 102, information indicating an operation status, such as image recording or recording standby state, and information indicating an error state, such as a recording-disabled state. Further, the image-capturing information includes, for example, information indicating that an image captured by another user terminal is being displayed, the number of other user terminals that are displaying the image captured by the user terminal 100, and subject information regarding a specific person recognized by the user terminal 100.

The image receiving unit 115 receives image data transmitted by other user terminals. The system control unit 117 switches the image data output from the image processing unit 102 to the image output unit 105 to the image data received by the image receiving unit 115, in accordance with an operation instruction given from the operation unit 109. The image receiving unit 116 receives image-capturing information transmitted from other user terminals.

The system control unit 117 oversees and controls each component of the user terminal 100. The system control unit 117 includes an arithmetic processing unit constituted by at least one processor or circuit, a non-volatile memory such as a ROM, and a volatile memory such as a RAM. The system control unit 117 controls each component of the user terminal 100 by loading and executing programs stored in the ROM. Note that the programs include programs for executing the later-described flowcharts shown in FIGS. 5A, 5B, 6A, 6B and 6C. The system control unit 117 collects image-capturing information regarding the aforementioned image data and the like, and outputs the collected information to the information transmitting unit 114.

The system control unit 117 causes the OSD rendering unit 104 to render guides or indexes representing image-capturing directions and image-capturing states of other user terminals based on the image-capturing information regarding the other user terminals received by the information receiving unit 116. After the rendering has been performed, the OSD rendering unit 104 outputs the rendered data as OSD data to the image output unit 105. The image output unit 105 generates a display image signal by superimposing the indexes rendered by the OSD rendering unit 104 with the image data processed by the image processing unit 102, and outputs the generated image signal to the display unit 106.

If a display position of an index representing the image-capturing direction and the image-capturing state of another user terminal that is displayed in the display unit 106 is touched, the system control unit 117 is also notified that the touch detection unit 107 has detected a touch operation. Upon the system control unit 117 being notified by the touch detection unit 107 that the display position of the index representing the image-capturing position and the image-capturing direction of the other user terminal have been touched, the system control unit 117 stops outputting image data from the image processing unit 102 to the image output unit 105 and performs control such that image data is output from the image receiving unit 115 to the image output unit 105.

Figure 2A:
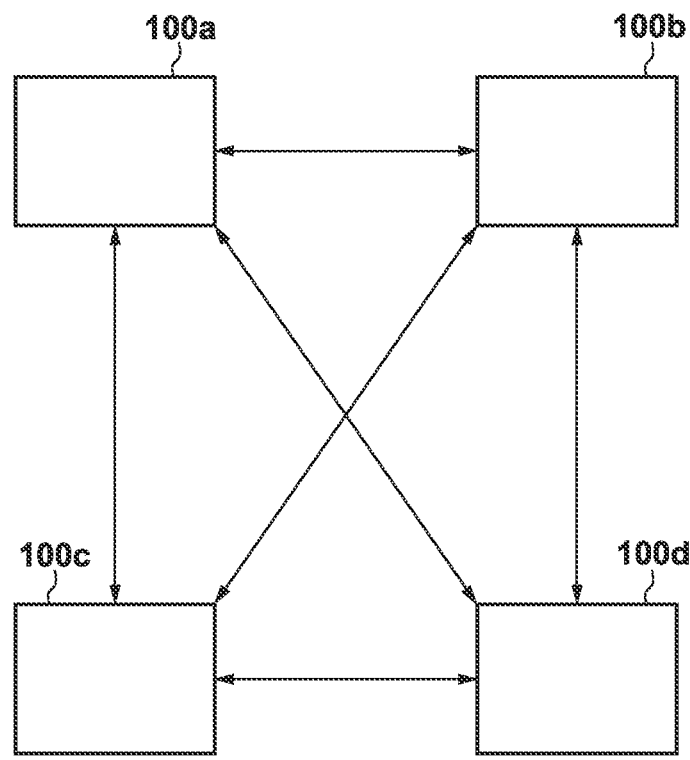
FIG. 2A is a system configuration diagram of the present embodiment.

FIG. 2A shows an example of a system configuration in which a plurality of user terminals are communicatively connected by a first communication method and images of the same subject can be captured by the plurality of user terminals at the same time.

In the following description, the plurality of user terminals 100a, 100b, 100c, and 100d are referred to as first to fourth cameras that are capable of capturing images of the same subject at the same time.

The first camera 100a is connected to and able to directly communicate with the second camera 100b, the third camera 100c, and the fourth camera 100d by the first communication method, and is capable of two-way communication with the second to fourth cameras 100b to 100d. The second camera 100b, the third camera 100c, and the fourth camera 100d are also similarly connected to and able to directly communicate with the other cameras by the first communication method, and are capable of two-way communication with the other cameras. The first communication method may be, for example, a method of connecting as a client to an access point formed by a user terminal (WiFi Direct).

Figure 2B:
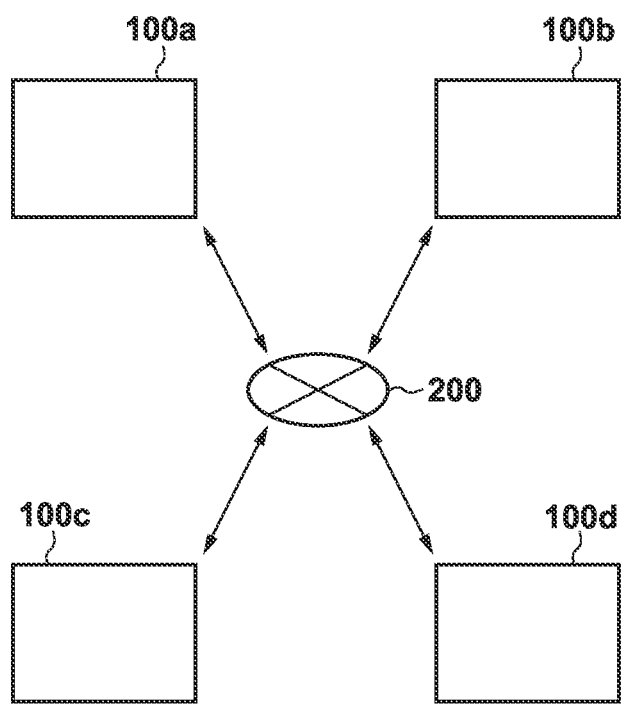
FIG. 2B is another system configuration diagram of the present embodiment.

FIG. 2B shows an example of a system configuration in which the plurality of user terminals are communicatively connected by a second communication method and images of the same subject can be captured by the plurality of user terminals at the same time.

The first camera 100a, the second camera 100b, the third camera 100c, and the fourth camera 100d are connected to be able to communicate with each other via a predetermined network 200, and are capable of two-way communication with each other. The predetermined network 200 is for mobile communications using 4G or 5G, wireless communications using a wireless LAN, or network communications using a peer-to-peer network, for example.

Figure 3:
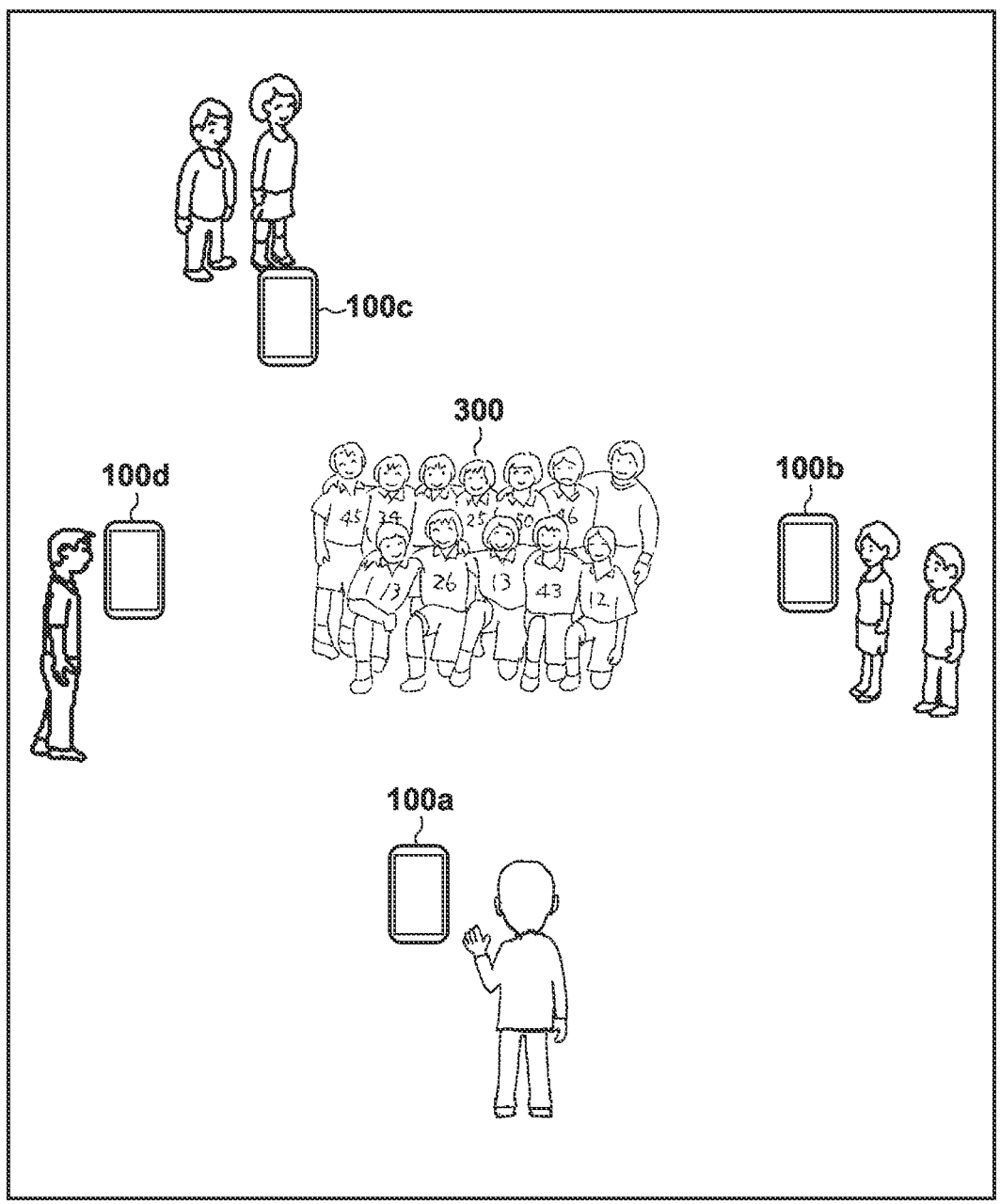
FIG. 3 shows an example of an image-capturing state of the present embodiment.

FIG. 3 shows an example of a situation where a plurality of user terminals in the present embodiment are connected to and able to communicate with each other and capture images of the same subject at the same time. The first camera 100a, the second camera 100b, the third camera 100c, and the fourth camera 100d surround a subject 300, and the respective user terminals capture images of the same subject at the same time. The images captured by each of the first to fourth cameras 100a to 100d can be transmitted to the other cameras that are connected to be able to communicate with them. Whether or not the cameras are capturing images of the same subject can be determined by performing pattern matching processing and subject recognition processing on the subject in the images captured by each of the first to fourth cameras 100a to 100d and checking whether the subject matches. Alternatively, image analysis processing may be performed using AI to determine whether the subject matches. Alternatively, a configuration may be adopted where the range in which each of the second to fourth cameras 100b to 100d can capture an image is identified based on the image-capturing position and the image-capturing direction thereof, and it is determined that an image of the same subject is being captured if the range in which the first camera 100a can capture an image identified based on the image-capturing position and the image-capturing direction thereof overlaps the above-identified range.

FIGS. 4A to 4G show screen examples of the display unit 106 of the first camera 100a in the image-capturing state in FIG. 3.

Figure 4A:
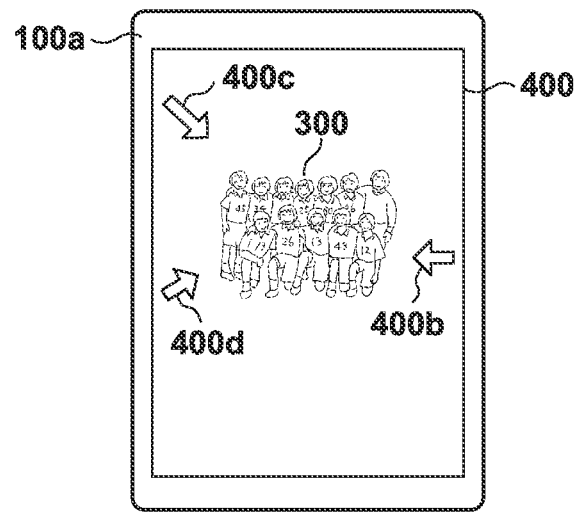
FIG. 4A shows a screen example in the image-capturing state in FIG. 3.

A screen 400 in FIG. 4A displays second to fourth guides 400b to 400d that indicate image-capturing directions at locations corresponding to respective image-capturing positions of the second camera 100b, the third camera 100c, the fourth camera 100d around the subject 300, the second to fourth guides 400b to 400d being superimposed on a live view image captured by the first camera 100a. The first guide 400b of the present embodiment is displayed in the form of an arrow (vector) representing the image-capturing position and the image-capturing direction of the second camera 100b. The second guide 400c is displayed in the form of an arrow (vector) representing the image-capturing position and the image-capturing direction of the third camera 100c. The third guide 400d is displayed in the form of an arrow (vector) representing the image-capturing position and the image-capturing direction of the fourth camera 100d. The information receiving unit 116 of the first camera 100a receives information representing the image-capturing positions and the image-capturing directions of the second to fourth cameras 100b to 100d, from the second to fourth cameras 100b to 100d.

Figure 4B:
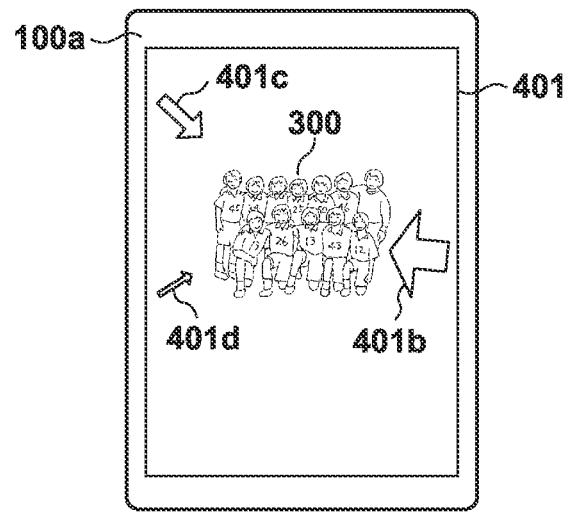
FIG. 4B shows a screen example in the image-capturing state in FIG. 3.

A screen 401 in FIG. 4B identifiably displays, in different forms, arrows corresponding to second to fourth guides 401b to 401d that represent the image-capturing directions at the locations corresponding to the respective image-capturing positions of the second to fourth cameras 100b to 100d around the subject 300, the arrows being superimposed on the live view image captured by the first camera 100a. The arrows of the second to fourth guides 401b to 401d are different in size from the second to fourth guides 400b to 400d in FIG. 4A. The arrows of the second to fourth guides 401b to 401d have sizes that are changed in accordance with the resolution of the images captured by and received from the second to fourth cameras 100b to 100d. Specifically, the arrows of the second to fourth guides 401b to 401d have respective sizes that are changed such that the larger the resolution of the image captured by each camera is, the larger the size of the corresponding arrow is. The information receiving unit 116 of the first camera 100a receives information representing the resolutions of the images captured by the second to fourth cameras 100b to 100d, from the second to fourth cameras 100b to 100d.

Note that a display form may be employed in which the sizes (lengths) of the second to fourth guides 401b to 401d vary depending on the distance from the second to fourth cameras 100b to 100d to the subject (the longer the distance from the second to fourth camera 100b to 100d to the subject, the longer the guides are).

Figure 4C:
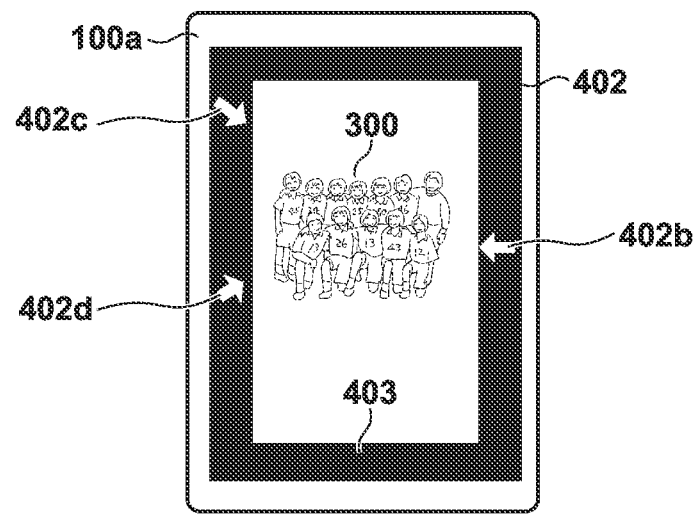
FIG. 4C shows a screen example in the image-capturing state in FIG. 3.

A screen 402 in FIG. 4C displays arrows corresponding to second to fourth guides 402b to 402d that represent the image-capturing directions at the locations corresponding to the respective image-capturing positions of the second to fourth cameras 100b to 100d within a dark region (surrounding area) 403 formed at the periphery of the live view image captured by the first camera 100a. This enables the image-capturing positions and the image-capturing directions of the second to fourth cameras 100b to 100d to be checked while maintaining the visibility of the live view image. In this case, (the length and thickness of) the arrows corresponding to the second to fourth guides 402b to 402d may be identifiably displayed in different forms depending on the resolution of the image captured by each camera, similarly to the second to fourth guides 401b to 401d in FIG. 4B. The information receiving unit 116 of the first camera 100a receives information representing the image-capturing positions and the image-capturing directions of the second to fourth cameras 100b to 100d, from the second to fourth cameras 100b to 100d.

Note that the positions at which the second to fourth guides 402b to 402d are displayed may be set by a user operation. In this case, the user can set whether to display the second to fourth guides 402b to 402d superimposed on the image, or display the second to fourth guides 402b to 402d in the dark region.

Figure 4D:
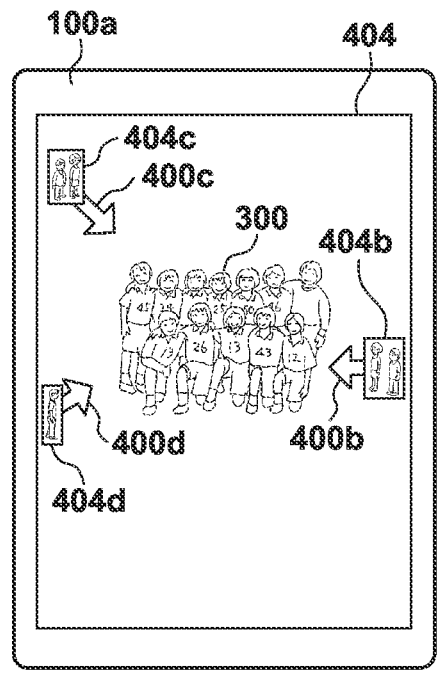
FIG. 4D shows a screen example in the image-capturing state in FIG. 3.

A screen 404 in FIG. 4D displays arrows corresponding to the second to fourth guides 400b to 400d that represent the image-capturing directions at the locations corresponding to the respective image-capturing positions of the second to fourth cameras 100b to 100d around the subject 300 in a mode combined with partial images 404b to 404d of second to fourth images captured by the respective cameras, the arrows being superimposed on the live view image captured by the first camera 100a. The information receiving unit 116 of the first camera 100a receives information representing the image-capturing positions and the image-capturing directions of the second to fourth cameras 100b to 100d, from the second to fourth cameras 100b to 100d. The image receiving unit 115 of the first camera 100a receives the images captured by the second to fourth cameras 100b to 100d, from the second to fourth cameras 100b to 100d. In this case, the arrows corresponding to the second to fourth guides 400b to 400d may be identifiably displayed in different modes depending on the resolution of the image captured by each camera, similarly to the second to fourth guides 401b to 401d in FIG. 4B.

Note that the second to fourth images 404b to 404d may be images captured with in-cameras, i.e. images captured while directing the cameras toward the users (photographer) of the respective cameras, or cameras captured with the out-cameras images, i.e. images captured while directing the cameras to the side opposite to the user side. The images captured with the in-cameras facilitate identification of the cameras by the photographers. The images captured with the out-cameras make it easy to check the images that are being captured by the respective cameras.

Figure 4E:
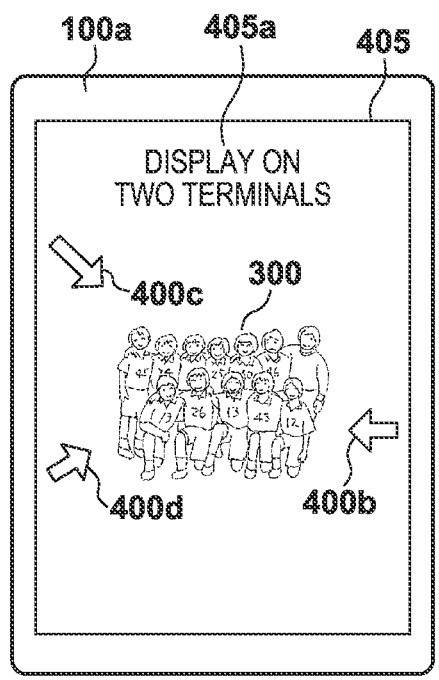
FIG. 4E shows a screen example in the image-capturing state in FIG. 3.

A screen 405 in FIG. 4E displays the arrows corresponding to the second to fourth guides 400b to 400d that represent the image-capturing directions at the locations corresponding to the respective image-capturing positions of the second to fourth cameras 100b to 100d around the subject 300, the arrows being superimposed on the live view image captured by the first camera 100a. In addition, the screen 405 displays, in an upper portion thereof, information 405a indicating the number of other cameras that are displaying the live view image captured by the first camera 100a, out of the second to fourth cameras 100b to 100d. The information receiving unit 116 of the first camera 100a receives, from the second to fourth cameras 100b to 100d, information representing that some of the second to fourth cameras 100b to 100d are displaying the live view image captured by the first camera 100a.

Note that information such as the angle of view, the number of people in each image, a specific person in each image, or the like, may be displayed instead of information representing the number of other cameras.

Figure 4F:
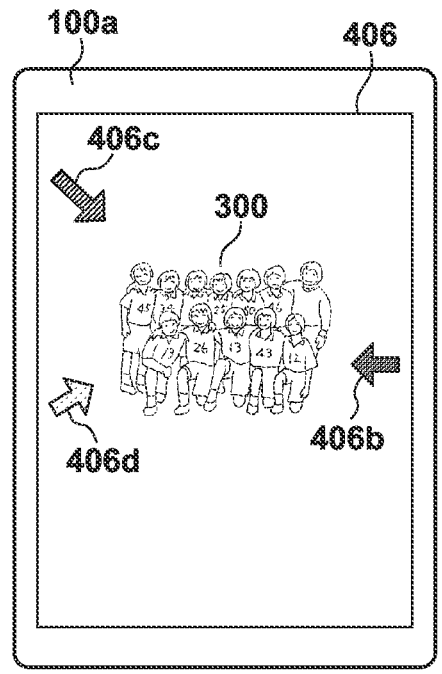
FIG. 4F shows a screen example in the image-capturing state in FIG. 3.

A screen 406 in FIG. 4F identifiably displays, in different forms, arrows corresponding to second to fourth guides 406b to 406d that represent the image-capturing directions at the locations corresponding to the respective image-capturing positions of the second to fourth cameras 100b to 100d around the subject 300, the arrows being superimposed on the live view image captured by the first camera 100a. The arrows of the second to fourth guides 406b to 406d are different in color from the second to fourth guides 400b to 400d in FIG. 4A. The arrows of the second to fourth guides 406b to 406d have colors that are changed depending on the operation status of the second to fourth cameras 100b to 100d received from the respective cameras. Specifically, the display form of each of the second to fourth guides 406b to 406d is changed to a darker color if the corresponding camera is recording, an intermediate color between darker and lighter colors if the camera is waiting to record an image, and a lighter color if the camera is in an error state for some reason. The information receiving unit 116 of the first camera 100a receives information indicating the operation status of the second to fourth cameras 100b to 100d, from the second to fourth cameras 100b to 100d.

Figure 4G:
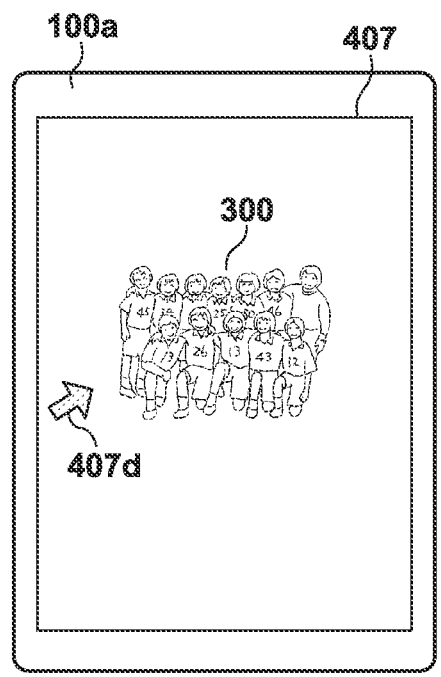
FIG. 4G shows a screen example in the image-capturing state in FIG. 3.

A screen 407 in FIG. 4G displays only a light-colored arrow representing the error state as a fourth guide 407d indicating the operation status of the fourth camera 100d around the subject 300, the arrow being superimposed on the live view image captured by the first camera 100a, while dark-colored and intermediate-colored arrows representing the second and third guides 406b and 406c of the second and the third cameras 100b and 100c, whose operation status is not the error state, are not displayed. The information receiving unit 116 of the first camera 100a receives information indicating the operation status of the second to fourth cameras 100b to 100d, from the second to fourth cameras 100b to 100d. This enables the user of the first camera 100a to check which camera is in the error state out of the second to fourth cameras 100b to 100d.

Control Processing

Next, control processing performed by each camera that constitutes the system of the present embodiment will be described with reference to FIGS. 5A, 5B, 6A, 6B, and 6C.

The following describes an operation procedure when the first camera 100a communicates with the second to fourth cameras 100b to 100d, based on the description given with reference to FIG. 3 and FIGS. 4A to 4G; however, the second to fourth cameras 100b to 100d can also operate similarly.

Note that processing in FIGS. 5A, 5B, 6A, 6B, and 6C is realized by the system control unit 117 of the camera 100 loading a program stored in the recording medium 108 to the memory and executing the loaded program to control each component of the first camera 100a.

Figure 5A:
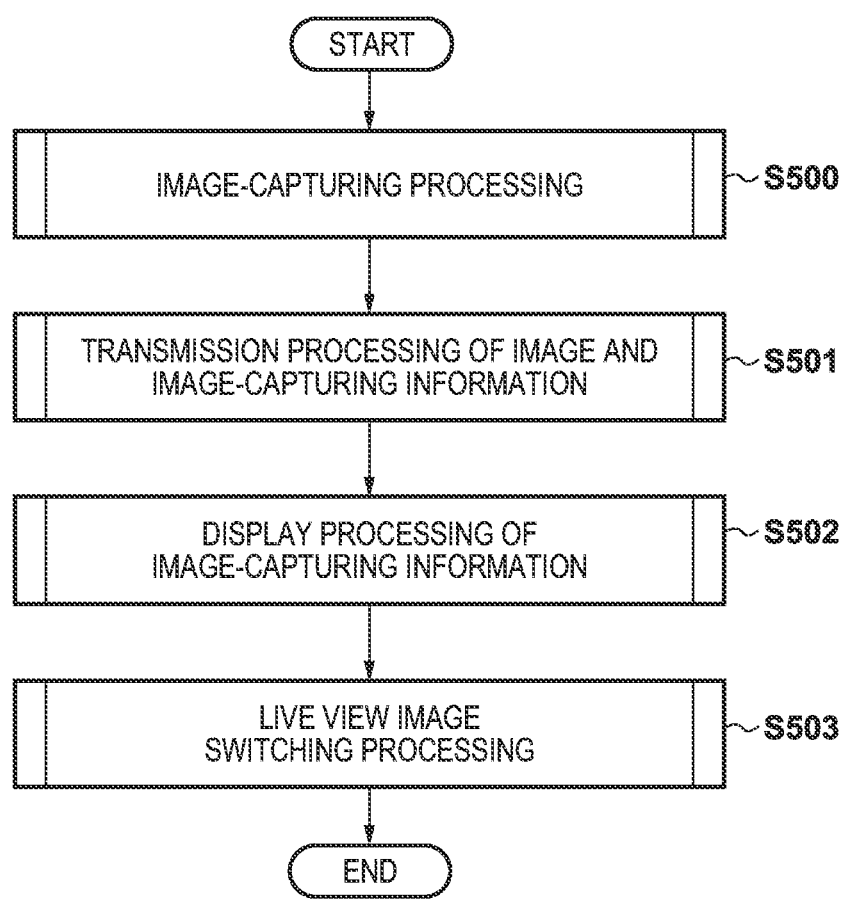
FIG. 5A is a flowchart showing an operation procedure when an image is captured.

First, an operation procedure when an image is captured will be described with reference to FIG. 5A.

In step S500, the system control unit 117 controls each component of the first camera 100a and obtains an image by executing processing to capture an image of a subject.

In step S501, the system control unit 117 performs processing to collect image-capturing information from each component of the first camera 100a and cause the information transmitting unit 114 to transmit the image-capturing information to the second to fourth cameras 100b to 100d, and advances the processing to step S502.

In step S502, the system control unit 117 performs processing to determine the type and display form of each guide to be displayed based on the image-capturing information obtained from the second to fourth cameras 100b to 100d by the information receiving unit 116 and cause the display unit 106 to display the guides, and advances the processing to step S503.

In step S503, the system control unit 117 performs processing to switch the live view image to be displayed in the display unit 106 in accordance with a touch operation detected by the touch detection unit 107, and ends the processing.

Figure 5B:
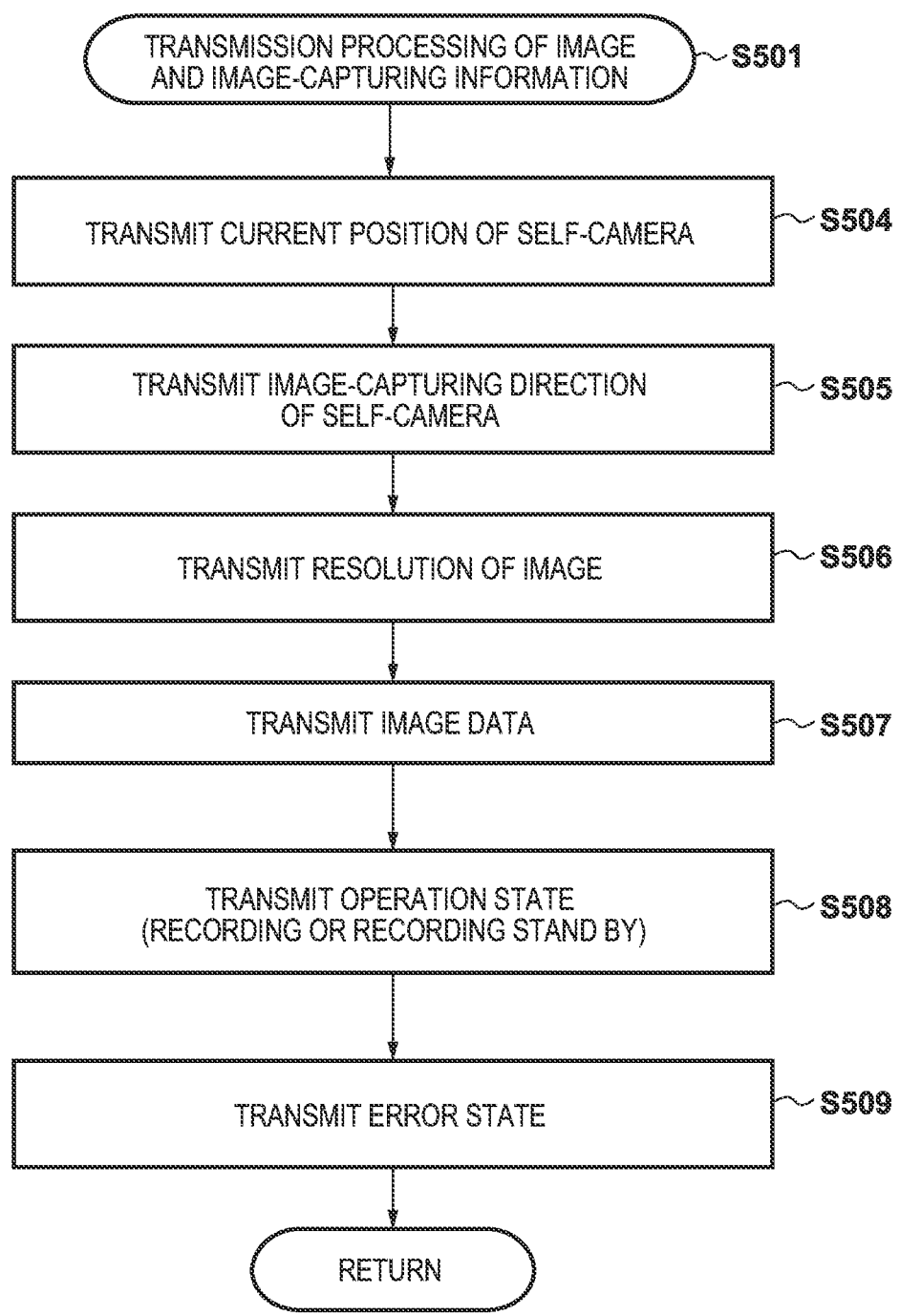
FIG. 5B is a flowchart showing an operation procedure when an image and image-capturing information are transmitted.

Next, an operation procedure when an image and image-capturing information are transmitted will be described with reference to FIG. 5B.

In step S504, the system control unit 117 performs processing to cause the information transmitting unit 114 to transmit the current position of the first camera 100a (the image-capturing position of the subject) detected by the position detection unit 111 to the second to fourth cameras 100b to 100d, and advances the processing to step S505.

In step S505, the system control unit 117 performs processing to determine an image-capturing direction based on tilt information regarding the first camera 100a detected by the posture detection unit 110 and cause the information transmitting unit 114 to transmit the determined image-capturing direction to the second to fourth cameras 100b to 100d, and advances the processing to step S506.

In step S506, the system control unit 117 performs processing to cause the information transmitting unit 114 to transmit, to the second to fourth cameras 100b to 100d, resolution information regarding the image that has been used in resizing processing by the image processing unit 102, and advances the processing to step S506.

In step S507, the system control unit 117 performs control to cause the image transmitting unit 113 to transmit the image data processed by the image processing unit 102 to the second to fourth cameras 100b to 100d, and advances the processing to step S508.

In step S508, the system control unit 117 performs processing to cause the information transmitting unit 114 to transmit information indicating the operation status (image recording or recording standby) to the second to fourth cameras 100b to 100d, and advances the processing to step S509.

In step S509, the system control unit 117 performs processing to cause the information transmitting unit 114 to transmit information indicating the error state to the second to fourth cameras 100b to 100d, and ends the processing.

Figure 6A:
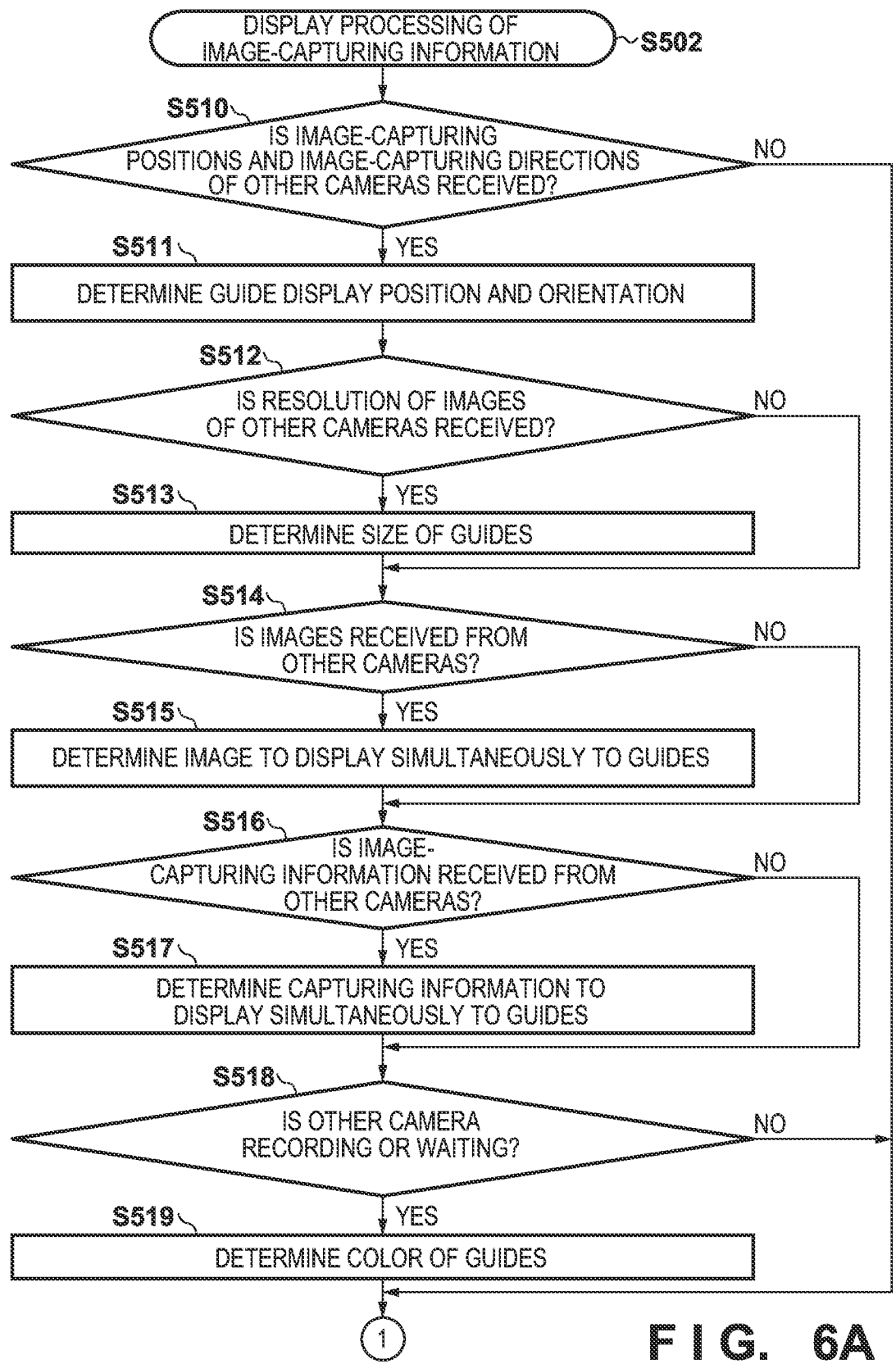
FIG. 6A is a flowchart showing an operation procedure when image-capturing information is displayed.

FIGS. 6A and 6B illustrate an operation procedure when image-capturing information is displayed.

In step S510, the system control unit 117 determines whether or not the information receiving unit 116 has received information indicating the image-capturing positions and the image-capturing directions of the second to fourth cameras 100b to 100d. The system control unit 117 advances the processing to step S511 when the system control unit 117 determines that the information has been received, and advances the processing to step S520 when the system control unit 117 determines that the information has not been received.

In step S511, the system control unit 117 determines the display position and orientation of each guide based on the information received by the information receiving unit 116 indicating the image-capturing positions and the image-capturing directions of the second to fourth cameras 100b to 100d, and advances the processing to step S512. Note that the system control unit 117 determines whether or not each of the second to fourth cameras 100b to 100d is capturing an image of a range that includes the same subject as that of the first camera 100a (i.e. whether or not each of the second to fourth cameras 100b to 100d can capture an image of this range). The system control unit 117 then determines the display position and orientation of each guide based on the information indicating the image-capturing positions and the image-capturing directions of the cameras that are capturing an image of the range that includes the same subject (i.e. that can capture an image of this range), of the second to fourth cameras 100b to 100d.

The display shown in the screen 400 in FIG. 4A can be executed by performing control to display the image obtained in step S500 as a live view image and controlling the OSD rendering unit 104 using the display position and orientation of each guide determined in step S511. With the screen 400 displayed, the system control unit 117 may also switch the screen to display the surrounding area shown in the screen 402 in FIG. 4C in response to accepting a predetermined operation, such as tapping on the live view image region.

In step S512, the system control unit 117 determines whether or not the information receiving unit 116 has received the resolution information regarding the images captured by the second to fourth cameras 100b to 100d. The system control unit 117 advances the processing to step S513 when the system control unit 117 determines that the information has been received, and advances the processing to step S514 when the system control unit 117 determines that the information has not been received.

In step S513, the system control unit 117 determines the size of each guide in correspondence with the resolution information regarding the images captured by the second to fourth cameras 100b to 100d received by the information receiving unit 116, and advances the processing to step S514. Note that the display shown in the screen 401 in FIG. 4B can be executed by performing control to display the image obtained in step S500 as a live view image and controlling the OSD rendering unit 104 using the display position and orientation of each guide determined in step S511 and the sizes thereof determined in step S513.

In step S514, the system control unit 117 determines whether or not the image receiving unit 115 has received the images captured by the second to fourth cameras 100b to 100d. The system control unit 117 advances the processing to step S515 when the system control unit 117 determines that the images have been received, and advances the processing to step S516 when the system control unit 117 determines that the images have not been received.

In step S515, the system control unit 117 determines an image to be displayed simultaneously with the guides from among the images captured by the second to fourth cameras 100b to 100d received by the image receiving unit 115, and advances the processing to step S516.

Note that the display shown in the screen 404 in FIG. 4D can be executed by performing control to display the image obtained in step S500 as a live view image and controlling the OSD rendering unit 104 using the display position and orientation of each guide determined in step S511 and the image determined in step S515.

In step S516, the system control unit 117 determines whether the information receiving unit 116 has received image-capturing information from the second to fourth cameras 100b to 100d. The system control unit 117 advances the processing to step S517 when the system control unit 117 determines that the information has been received, and advances the processing to step S518 when the system control unit 117 determines that the information has not been received.

In step S517, the system control unit 117 determines information to be displayed simultaneously with the guides based on the image-capturing information regarding the second to fourth cameras 100b to 100d received by the information receiving unit 116, and advances the processing to step S519.

In step S518, the system control unit 117 determines whether or not the information receiving unit 116 has received information indicating the operation status of the second to fourth cameras 100b to 100d. The system control unit 117 advances the processing to step S519 when the system control unit 117 determines that the information has been received, and advances the processing to step S520 when the system control unit 117 determines that the information has not been received.

In step S519, the system control unit 117 determines the color or brightness of each guide based on the information indicating the operation status of the second to fourth cameras 100b to 100d received by the information receiving unit 116, and advances the processing to step S520. Note that the display shown in the screen 406 in FIG. 4F can be executed by performing control to display the image obtained in step S500 as a live view image and controlling the OSD rendering unit 104 using the display position and orientation of each guide determined in step S511 and the color or brightness of each guide determined in step S519.

In step S520, the system control unit 117 determines whether or not the information receiving unit 116 has received information indicating the error state of any of the second to fourth cameras 100b to 100d. The system control unit 117 advances the processing to step S521 when the system control unit 117 determines that the information has been received, and advances the processing to step S523 when the system control unit 117 determines that the information has not been received.

In step S521, the system control unit 117 determines whether or not the camera in the error state is located near the first camera 100a based on the information indicating the error state received by the information receiving unit 116. The system control unit 117 advances the processing to step S522 when the system control unit 117 determines that the camera in the error state is located near the first camera 100a, and advances the processing to step S523 when the system control unit 117 determines that the camera in the error state is not located near the first camera 100a.

In step S522, the system control unit 117 determines the display position and orientation of each guide based on the information regarding the error state as well as the image-capturing positions and the image-capturing directions of the second to fourth cameras 100b to 100d received by the information receiving unit 116, and advances the processing to step S523. Note that the display shown in the screen 407 in FIG. 4G can be executed by performing control to display the image obtained in step S500 as a live view image and controlling the OSD rendering unit 104 using the display position and orientation of each guide determined in step S522.

In step S523, the system control unit 117 controls the OSD rendering unit 104 so as to render the guides based on the display position and orientation of each guide determined in step S511, the size of each guide determined in step S513, the image to be displayed simultaneously with the guides determined in step S515, the image-capturing information to be displayed simultaneously with the guides determined in step S517, and the display position and orientation of each guide determined in step S522, and advances the processing to step S524.

In step S524, the system control unit 117 determines whether or not the information receiving unit 116 has received information indicating whether any of the second to fourth cameras 100b to 100d is displaying the image captured by the first camera 100a. The system control unit 117 advances the processing to S525 when the system control unit 117 determines that the information indicating whether any of the second to fourth cameras 100b to 100d is displaying the image captured by the first camera 100a, and ends the processing when the system control unit 117 determines that the information indicating whether any of the second to fourth cameras 100b to 100d is not displaying the image captured by the first camera 100a.

In step S525, the system control unit 117 controls the OSD rendering unit 104 so as to render an OSD indicating the number of cameras that are displaying the image captured by the first camera 100a out of the second to fourth cameras 100b to 100d, based on the information indicating whether or not any of the second to fourth cameras 100b to 100d is displaying the image captured by the first camera 100a that is received by the information receiving unit 116, executes the display shown in the screen 405 in FIG. 4E, and ends the processing.

Figure 6C:
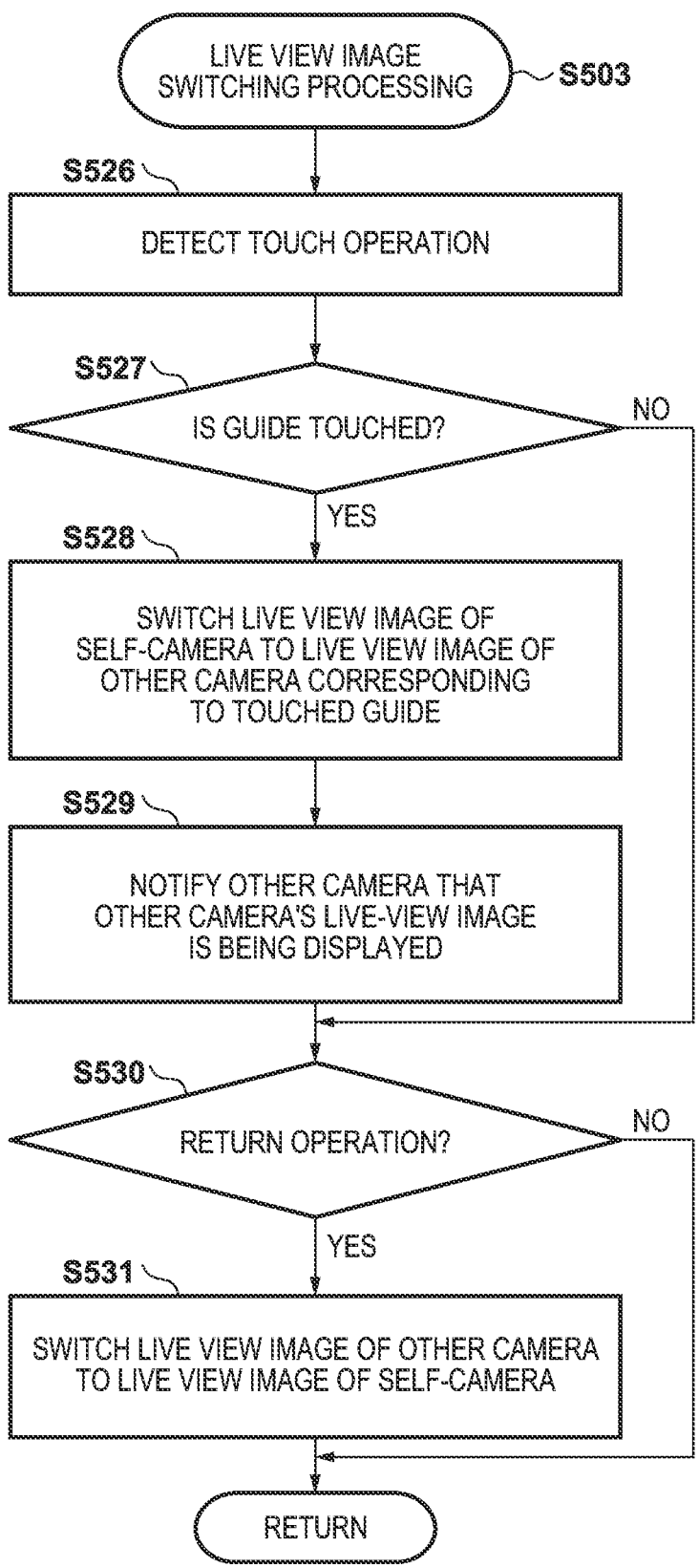
FIG. 6C is a flowchart showing an operation procedure when a live view image is switched.

Next, an operation procedure when a live view image is switched will be described with reference to FIG. 6C.

In step S526, the system control unit 117 receives, from the touch detection unit 107, a notification that a touch operation has been detected, and advances the processing to step S527.

In step S527, the system control unit 117 determines whether or not the touch operation received in step S526 is an operation made to any of the guides 400b to 400d shown in FIG. 4A. The system control unit 117 advances the processing to step S528 when the system control unit 117 determines that the touch operation has been made to any of the guides 400b to 400d, and advances the processing to step S530 when the system control unit 117 determines that the touch operation has not been made to any of the guides 400b to 400d.

In step S528, the system control unit 117 performs processing to output, to the image output unit 105, one of the images captured by the second to fourth cameras 100b to 100d that are received by the image receiving unit 115 in correspondence with the guide touched in step S527, and advances the processing to step S529.

In step S529, the system control unit 117 performs processing to cause the information transmitting unit 114 to transmit information indicating that one of the images captured by the second to fourth cameras 100b to 100d that corresponds to the guide touched in step S527 is being displayed, and advances the processing to S530.

In step S530, the system control unit 117 determines whether or not an operation to return the display to the image captured by the first camera 100a has been performed. The system control unit 117 advances the processing to step S531 when the system control unit 117 determines that the operation to return the display has been performed, and ends the processing when the system control unit 117 determines that the operation to return the display has not been performed. The operation to return the display may be, for example, pressing a cancel button or a home button included in the operation unit 109, or a touch operation such as flicking or tapping.

In step S531, the system control unit 117 performs processing to output an image processed by the image processing unit 102 to the image output unit 105, and ends the processing.

According to the present embodiment, when a plurality of cameras capture images of the same subject at the same time, and one camera ("first camera") out of the cameras displays an image captured by another camera, the first camera selectably displays, on the image captured thereby, guides indicating the image-capturing positions and the image-capturing directions of the images captured by the other cameras, so that a user of the first camera can select and display an image captured at a desired image-capturing position and in a desired image-capturing direction without performing the operation to repeatedly switch between the images captured by the other cameras, as described above.

According to the present embodiments, a user can select and display an image captured at a desired image-capturing position and in a desired image-capturing direction without performing the operation to repeatedly switch between images from other user terminals when displaying, on a user terminal of the user, an image captured by another user terminal.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™, a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. An image capture apparatus comprising:
a processor; and
a memory storing instructions which, when executed by the processor, configure the processor of the image capture apparatus to:
capture an image of a subject;
perform control to display the image of the subject on a screen;
obtain first information regarding an image-capturing position and an image-capturing direction of a second image capture apparatus;
receive an image captured by the second image capture apparatus;
determine whether or not the second image capture apparatus is capable of capturing an image of a range including the subject; and
accepting a predetermined operation,
wherein, when the second image capture apparatus is capable of capturing an image of the range including the subject, a control is performed to display, on the image of the subject, an index indicating the image-capturing direction at a location corresponding to the image-capturing position of the image in an area at a periphery of the image of the subject in response to the predetermined operation being accepted, based on the first information, and
wherein the determination is performed by executing pattern matching processing or subject recognition processing on the image of the subject and the received image, and the second image capture apparatus is capable of capturing an image of the range including the subject if the subject matches a subject included in the received image.

2. The image capture apparatus according to claim 1, wherein the determination is performed based on the first information, whether or not the other-second image capture apparatus is capable of capturing an image of the range including the subject.

3. The image capture apparatus according to claim 1, wherein the instructions, when executed by the processor, further configure the processor of the image capture apparatus to accept an operation to select the index,
wherein the control is performed to switch an image displayed on the screen from the image of the subject to the image captured by the ether second image capture apparatus corresponding to the selected index.

4. The image capture apparatus according to claim 1, wherein the instructions, when executed by the processor, further configure the processor of the image capture apparatus to:
detect a tilt of the image capture apparatus;
detect a position of the image capture apparatus; and
transmit to the second image capture apparatus, an image-capturing position and an image-capturing direction of the image capture apparatus based on information representing the tilt and the position of the image capture apparatus.

5. The image capture apparatus according to claim 1, wherein
the index is a vector indication indicating the image-capturing direction based on the first information.

6. The image capture apparatus according to claim 5, wherein
a size of the vector indication varies depending on a distance from the other second image capture apparatus to the subject.

7. The image capture apparatus according to claim 1, wherein the instructions, when executed by the processor, further configure the processor of the image capture apparatus to:
obtain second information regarding resolution of an image captured by the second image capture apparatus, and
wherein the control is performed to display the index such that the resolution is identifiable.

8. The image capture apparatus according to claim 1, wherein the instructions, when executed by the processor, further configure the processor of the image capture apparatus to:
obtain third information regarding an operation status of the second image capture apparatus, and
the control is performed to display the index such that the operation status is identifiable.

9. The image capture apparatus according to claim 8, wherein
the operation status includes recording in which an image is being recorded, standby in which an image is not being recorded, and an error state in which an image is unrecordable.

10. The image capture apparatus according to claim 9, wherein the instructions, when executed by the processor, further configure the processor of the image capture apparatus to perform control to display only the index corresponding to the second image capture apparatus in the error state.

11. The image capture apparatus according to claim 1, wherein the instructions, when executed by the processor, further configure the processor of the image capture apparatus to receive a second image that is an image of a photographer of the second image capture apparatus that is captured by the second image capture apparatus,
wherein the control is performed to display the second image on the image of the subject together with the index.

12. The image capture apparatus according to claim 1, wherein the instructions, when executed by the processor, further configure the processor of the image capture apparatus to receive a third image that is being captured by the second image capture apparatus,
wherein the control is performed to display a portion of the third image on the image of the subject together with the index.

13. A method of controlling an image capture apparatus, the method comprising:
capturing an image of a subject;
performing control to display the image of the subject on a screen;
obtaining first information regarding an image-capturing position and an image-capturing direction of a second image capture apparatus;
receiving an image captured by the second image capture apparatus;

determining whether or not the second image capture apparatus is capable of capturing an image of a range including the subject; and accepting a predetermined operation, wherein, when the second image capture apparatus is capable of capturing an image of the range including the subject, the control is performed based on the first information to display, on the image of the subject, an index indicating the image-capturing direction at a location corresponding to the image-capturing position of the image in an area at a periphery of the image of the subject in response to the predetermined operation being accepted, and wherein, the determination is performed by executing pattern matching processing or subject recognition processing on the image of the subject and the received image, and the second image capture apparatus is capable of capturing an image of the range including the subject if the subject matches a subject included in the received image.

14. A non-transitory computer-readable storage medium storing a program for causing a computer to execute a method of controlling an image capture apparatus, the method comprising:

capturing an image of a subject;

performing control to display the image of the subject on a screen;

obtaining first information regarding an image-capturing position and an image-capturing direction of a second image capture apparatus;

receiving an image captured by the second image capture apparatus;

determining whether or not the second image capture apparatus is capable of capturing an image of a range including the subject; and accepting a predetermined operation, wherein, when the second image capture apparatus is capable of capturing an image of the range including the subject, the control is performed based on the first information to display, on the image of the subject, an index indicating the image-capturing direction at a location corresponding to the image-capturing position of the image in an area at a periphery of the image of the subject in response to the predetermined operation being accepted, and wherein, the determination is performed by executing pattern matching processing or subject recognition processing on the image of the subject and the received image, and the second image capture apparatus is capable of capturing an image of the range including the subject if the subject matches a subject included in the received image.

* * * * *